US008544284B2

(12) United States Patent
Gu et al.

(10) Patent No.: US 8,544,284 B2
(45) Date of Patent: Oct. 1, 2013

(54) METHOD AND APPARATUS FOR WASTE HEAT RECOVERY AND ABSORPTION GASES USED AS WORKING FLUID THEREIN

(75) Inventors: Junjie Gu, Ottawa (CA); James Gu, Ottawa (CA); Ruiying Cheng, Ottawa (CA); Cunzhu Liu, Hebei (CN); Shengchang Li, Hebei (CN)

(73) Assignees: Petrochina North China Petrochemical Company, Renqui, Hebei (CN); Junjie Gu, Ottawa, Ontario (CA)

( * ) Notice: Subject to any disclaimer, the term of this patent is extended or adjusted under 35 U.S.C. 154(b) by 477 days.

(21) Appl. No.: 12/823,191

(22) Filed: Jun. 25, 2010

(65) Prior Publication Data
US 2011/0314844 A1 Dec. 29, 2011

(51) Int. Cl.
*F25B 15/00* (2006.01)
(52) U.S. Cl.
USPC ............................................. 62/101; 626/476
(58) Field of Classification Search
USPC .................. 62/101, 238.3, 494, 476
See application file for complete search history.

(56) References Cited

U.S. PATENT DOCUMENTS

| 4,009,575 | A | * | 3/1977 | Hartman et al. | 60/648 |
|---|---|---|---|---|---|
| 4,266,404 | A | * | 5/1981 | ElDifrawi | 62/79 |
| 4,346,561 | A | | 8/1982 | Kalina | |
| 4,386,501 | A | * | 6/1983 | Jaeger | 62/112 |
| 4,523,631 | A | * | 6/1985 | McKinney | 165/43 |
| 5,007,240 | A | * | 4/1991 | Ishida et al. | 60/673 |
| 5,029,444 | A | | 7/1991 | Kalina | |
| 5,582,020 | A | | 12/1996 | Scaringe et al. | |
| 6,389,841 | B1 | * | 5/2002 | Feldman et al. | 62/476 |
| 6,942,779 | B2 | * | 9/2005 | Belongia et al. | 205/98 |
| 2002/0083720 | A1 | * | 7/2002 | Takao et al. | 62/54.1 |
| 2003/0019229 | A1 | * | 1/2003 | Dodo et al. | 62/238.3 |
| 2003/0221438 | A1 | * | 12/2003 | Rane et al. | 62/271 |

(Continued)

FOREIGN PATENT DOCUMENTS

CN 1186910 A 7/1998

OTHER PUBLICATIONS

Notification of the First Office Action, Chinese Application No. 200810009653, dated Jun. 29, 2011.

(Continued)

*Primary Examiner* — Mohammad M Ali
(74) *Attorney, Agent, or Firm* — MacMillan, Sobanski & Todd, LLC

(57) ABSTRACT

A method provides for waste heat power generation or heat recovery and for a driving power with an absorption process using low grade heat sources. An apparatus also provides for such waste heat recovery in absorption process and to the used vapor-salt working fluid. A low temperature heat source is used as a heating working medium to heat in a regenerator by heat exchange the absorption liquid working fluid from the absorber and consisting of a salt absorbent and ammonia or carbon dioxide as an absorbed agent to form the absorbent and the superheated high pressure absorbed agent. The superheated and vaporized absorbed agent enters into a turbine to provide energy and generate power via turbine expansion step. After heat release, the resultant low pressure absorbed agent is discharged from the turbine and returns to the absorption step and contacts with the absorbent from the regeneration step to form the absorption liquid which can enter into the next thermodynamic cycle process.

27 Claims, 3 Drawing Sheets

(56) References Cited

U.S. PATENT DOCUMENTS

| | | | |
|---|---|---|---|
| 2004/0128975 A1* | 7/2004 | Viteri | 60/39.55 |
| 2006/0080960 A1* | 4/2006 | Rajendran et al. | 60/649 |
| 2006/0197053 A1* | 9/2006 | Shiflett et al. | 252/67 |
| 2007/0019708 A1* | 1/2007 | Shiflett et al. | 374/181 |
| 2007/0051126 A1* | 3/2007 | Okuda et al. | 62/402 |
| 2008/0016903 A1* | 1/2008 | Artsiely | 62/476 |

OTHER PUBLICATIONS

Notification of the Second Office Action, State Intellectual Property Office of the People's Republic of Chine, Application No. 200810009653.0, Dated May 4, 2012.

* cited by examiner

METHOD AND APPARATUS FOR WASTE HEAT RECOVERY AND ABSORPTION GASES USED AS WORKING FLUID THEREIN

BACKGROUND OF THE INVENTION

The present invention relates to a method of waste heat recovery with absorption process, particularly to a method of waste heat recovery with absorption process from a low temperature heat source for power generation or heat collection and use as driving force. The present invention further relates to an apparatus of waste heat recovery in absorption manner and to a gas-salt working fluid such as ammonia-salt working fluid used therein.

In the industrial fields, there is a great amount of waste heat generated, such as flue gas, exhaust gas and process waste heat. Such heat is generally deemed as low grade because its recovery is technically difficult and hard to be implemented. Thus, a lot of low-grade heat sources are wasted. In many petrochemical plants, a great amount of low temperature low-grade heat is discharged, for example, a relatively large flow of hot water usually having a temperature of about 120° C. is discharged from heavy oil catalytic apparatus. As for the heat recovery from such low temperature heat sources, problems related to larger apparatus size, more complicated system and operational and maintenance problems usually exist in conventional steam system due to lower steam pressure and lower energy density. Other low boiling point working media such as hydrocarbons e.g., butane, pentane, have problems such as difficult to condense, poor thermal properties, flammable and environment pollution issues, and usually need multistage large apparatus and high investment and high operating cost due to their low enthalpy value and requirement of greater pressure ratio, so that process efficiency is usually low.

In the prior art, ammonia-water absorption pair as a working medium is proposed for energy recovery and use of low temperature heat sources such as Kalina cyclic power generation. For example, U.S. Pat. No. 4,346,561 discloses a method and apparatus for cyclic energy generation from low-grade heat sources by using ammonia and water as working fluid, and this method is particularly suitable for heat energy conversion of sea water. U.S. Pat. No. 5,029,444 also discloses a method and relevant apparatus for low temperature source cyclic power generation by using a mixed working medium of water and ammonia, wherein the temperature of heat sources usually is 230-400° F. These inventions also have the aforementioned problems caused by the presence of water, and separation unit have to be used for the separation of ammonia and water, so that equipment cost and energy consumption are relatively high.

The object of the present invention is to overcome or reduce at least part of the aforementioned drawbacks or to provide a useful alternative solution.

SUMMARY OF THE INVENTION

The present invention is based on the thermodynamic cycle principle of a process of absorbing ammonia or carbon dioxide with a salt mixture, utilizing it for recovery and recycle of low temperature heat sources, and implementing waste heat recovery such as low temperature heat power generation.

The first aspect of the present invention provides a method of waste heat recovery in absorption manner to effectively recover heat from a low temperature heat source, the method comprising the following steps:

a) Performing heat exchange between an absorption liquid consisting of an absorbent and an absorbed agent from an absorber and a heating working medium from a low temperature heat source in a regenerator to generate the absorbent and an superheated high pressure absorbed agent;

b) Conveying the superheated high pressure absorbed agent generated in Step a) to a turbine for generating power (power generation unit) or to a heat exchanger for providing a heat source (heat pump mode); and c) Contacting the absorbent generated in Step a) with the absorbed agent discharged from the turbine or the heat exchanger of Step b) to form the absorption liquid in the absorber.

The second aspect of the present invention provides an apparatus of waste heat recovery suitable for the method of waste heat recovery in absorption manner according to the present invention, the apparatus comprising:

a) A regenerator for performing a heat exchange between an absorption liquid consisting of an absorbent and an absorbed agent from an absorber and a heating working medium from a low temperature heat source to generate the absorbent and an superheated high pressure absorbed agent;

b) A turbine or a heat exchanger for generating a power or providing a heat source by using the superheated high pressure absorbed agent generated from the regenerator;

c) An absorber for forming an absorption liquid by contacting the absorbent generated in the regenerator with the absorbed agent discharged from the turbine or the heat exchanger; and d) A solution pump for conveying the absorption liquid back to the regenerator.

The method of waste heat recovery and the apparatus of waste heat recovery according to the present invention are suitable for waste heat recovery from low temperature heat sources usually having a temperature of lower than 300° C. but not lower than 70° C., for example between 70° C. and 200° C., and appropriately between 90° C. and 120° C. These heat sources include such as large flow of low temperature hot water discharged from heavy oil catalytic apparatus in petrochemical plants.

The third aspect of the present invention provides an absorption liquid consisting of an absorbent and an absorbed agent, wherein the absorbent is an inorganic salt such as lithium nitrate, sodium thiocyanate, potassium thiocyanate, potassium carbonate, or an organic and inorganic absorbent or a mixture thereof, and the absorbed agent is an ammonia vapor or carbon dioxide, or a mixture thereof.

The absorption liquid consisting of a gas such as ammonia or carbon dioxide and a salt according to the present invention has advantages such as high conversion efficiency, simple apparatus, as well as relative low cost, non-flammable, no greenhouse gas in term of environment protection. In addition, as compared with conventional water steam system, the ammonia absorption system of the present invention has advantage of high energy density and small apparatus size. For example, as for a waste heat source of 110° C., the energy density of water-steam system is 1200 kJ/m$^3$, while under the same condition, the ammonia absorption system has an energy density designed as 2600-2800 kJ/m$^3$. Although the leakage of gas such as ammonia may be harmful to human health, the pungent odor of such gas would alarm people when the gas is emitted in a trace amount so that the people could avoid sequent harm in time. Furthermore, as compared to the ammonia-water absorption process in the prior art, the ammonia-salt absorption process of the present invention do not need a separation column necessarily used in the prior art, so that both equipment cost in investment and energy consumption in separation are reduced.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
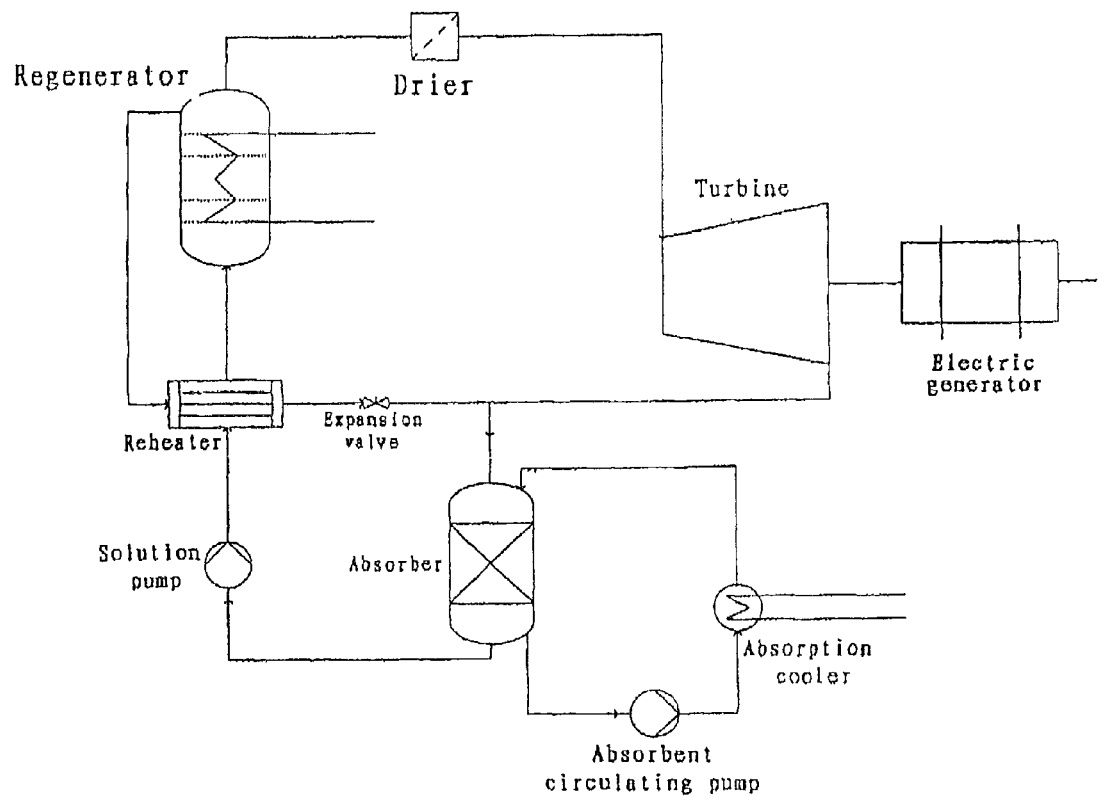
FIG. 1 is a schematic diagram of a process of power generation by using waste heat from a low temperature heat source, employing the thermodynamic cycle process using an absorption liquid consisting of ammonia and an inorganic salt mixture according to the present invention.

In order to provide a new method of waste heat recovery from a low temperature heat source, a relevant apparatus and an absorption liquid consisting of a gas and a salt mixture suitable for this method, the inventors of the present invention develop a new thermodynamic cycle process as shown in FIG. 1, comprising: units of absorption, regeneration, turbine expansion and heat exchange, etc. In the absorption step of this thermodynamic cycle, an absorption liquid as working medium consists of an absorbent and an absorbed agent, the absorption liquid enters the regenerator via a piping and subjected to heat exchange with a heating working medium from a low temperature heat source in the regeneration step to form the absorbent and an superheated high pressure absorbed agent, and the pressure of the working medium fluid can be elevated by using a solution pump. The heat exchange in the regenerator evaporates and superheats the absorbed agent of the working medium fluid. The evaporated and superheated absorbed agent enters into the turbine and generates power from energy provided by the turbine expansion step, and the generated power can be used to drive an electric generator for power generation or to connect to and provide power for other power driven devices. The evaporated and superheated absorbed agent as a heat source can also enter into a heat exchange device for heating. After the heat release procedure, the resultant low pressure absorbed agent is discharged from the turbine step and returns to the absorption step where it contacts again with the absorbent from the regeneration step to form the absorption liquid which can enter into the next thermodynamic cycle process.

Any low temperature sources having a temperature of not higher than 300° C., such as industrial waste gases, process waste heat, can be used as heat sources for the heat recovery according to the present invention. For example, a low temperature waste heat having a temperature of 90-110° C. discharged from a petroleum refinery can be used as a heat source for the waste heat recovery according to the present invention.

In view of the selection of the used low temperature heat sources and the aforementioned new thermodynamic cycle process, the inventors of the present invention develop a new absorbent-absorbed agent working medium via many experiments based on the absorption principle of mixture of gas and salt, wherein the absorbent is selected from conventional organic or inorganic absorbents, inorganic salts, in particular inorganic salts having a low-water content such as lower than 0.3 wt %, especially lower than 0.2 wt %, such as lithium nitrate, sodium thiocyanate, potassium thiocyanate and potassium carbonate, or their mixtures, such as at least one of non-volatile inorganic salts. The absorbed agent together with the absorbent to form the absorption liquid as working fluid correspondingly can be a gas or vapor or a mixture thereof highly volatile at low temperature, preferably selected from ammonia or carbon dioxide, or a mixture gas thereof. For example, in an embodiment of using ammonia as the absorbed agent, the used absorbent should have an absorption capacity as large as possible, and can complete desorption at a relatively low temperature and the absorption temperature is not too high. The action mechanism is that at a relatively low temperature, the absorbent absorbs ammonia gas to form an ammonia-enriched solution, the ammonia-enriched solution is conveyed by a pump into the regenerator, and the ammonia gas is desorbed out at a relatively high temperature. The ammonia gas with elevated temperature and pressure enters into the turbine for adiabatic expansion and the heat is converted into kinetic energy for achieving the purpose of recycling heat energy. It is preferred that an ammonia liquid is pre-mixed with an inorganic salt to achieve an ammonia amount of 25-36 wt %, such as 27-30 wt %, to form a pre-mixed absorption liquid flowing into the absorber, then ammonia is fed to achieve an excessive ammonia amount in a molar ratio of up to 30:1. The ratio of ammonia to salt in the system can be determined by measurement of temperature and pressure.

The absorbent-absorbed agent working fluid can further comprise other conventional ingredients known in the art, such as drying agents for removing moisture of the system, corrosion resistants and surfactant, etc. The drying agents can be silica gel, molecular sieves, calcium oxide or a mixture thereof in an amount of 0-6 wt %, preferably 0.1-5.5 wt %, more preferably 2-5 wt %, in relative to the solid weight of the absorbent. The corrosion resistants can be metal surface corrosion resistants in an amount of 0-2 wt %, preferably 0.01-1 wt %, in relative to the solid weight of the absorbent. The surfactants can be organic alcohols such as diethylhexanol, etc., in an amount of 0-2 wt %, preferably 0.01-1 wt %, in relative to the solid weight of the absorbent, such as 50-500 ppm. However, the total content of these additive ingredients is lower than 25 wt %, preferably lower than 22 wt %, in relative to the solid weight of the absorbent. Correspondingly, the content of the effective absorbent should be 52 wt % or more, preferably 55 wt % or more, in relative to the solid mixture weight of the absorbent. In addition, the salt concentration of the absorbent in different places of the system can be different depending on heat sources and environment temperature. For example, as for a low temperature waste heat source at 110° C., the salt concentration at the inlet of the regenerator can be such as 55-65 wt %, while that at the inlet of the absorber can be 60-68 wt %, in relative to the total weight of salt and ammonia solution and other additives.

FIG. 1 gives main equipments including absorber, regenerator, turbine and electric generator of an embodiment for implementing the thermodynamic cycle process according to the present invention, in which a low temperature heat source from an industrial waste heat is used as a heating medium for heat exchange in the regenerator to heat an absorption liquid from the absorber as working fluid consisting of the aforementioned absorbent and absorbed agent to form the absorbent and an superheated high pressure absorbed agent under heating condition.

The absorbent from the regenerator and the low pressure absorbed agent vapor from the turbine are combined in the absorber to form the absorption liquid as working fluid. Fresh absorbed agent can also be supplemented to ensure the content of the absorbed agent vapor significantly excessive the content of the absorbent in the absorber, such as in a molar ratio of 10:1 to 30:1. In order to ensure a sufficient mixing contact between the absorbent and the absorbed agent and facilitate the heat exchange, the absorber can be designed to use a liquid distributor and a lambdoid baffle structure, the absorber may have a packing material, and the heat discharged from the absorption process is removed by a cooling medium in a two-stage indirect heat exchange manner, wherein an intermediate transition fluid, preferably selected from water, water vapor, hexanediol solution and heat conduction oil can be used. The temperature of the absorbent and the absorbed agent in the absorber can be controlled at 25-70° C., preferably 30-40° C., and the pressure can be 0.1-0.51 MPa (1-5 atm), preferably 0.2-0.41 MPa (2-4 atm).

In advance the entrance of the absorption liquid from the absorber into the regenerator, the absorption liquid may pass an optional reheater such as shell-and-tube heat exchanger to ensure sufficient heat exchange and to promote system performance, and a solution pump may be further added to elevate the pressure of the working fluid so that the system can run in a smooth and balanced manner. In the meantime, the temperature of the absorption liquid conveyed out can be 90-120° C., preferably 105-110° C., and the system pressure can be 1.01-3.04 MPa (10-30 atm), preferably 1.52-2.23 MPa (15-22 atm), such as 1.72-1.93 MPa (17-19 atm).

During the operation of the absorber, undesired non-condensable gas may be generated in the system, thus a vent may be set at the top of the absorber to discharge the generated non-condensable gas.

The absorption liquid close to critical condition is discharged from the reheater and enters the regenerator, and this working fluid is heated in the regenerator by sufficient heat exchange such as counter current heat exchange using an intermediate transition fluid heated by an industrial waste heat, so that the absorbed agent in the absorption liquid is vaporized and superheated. At this time, the temperature of the superheated vapor can be up to 130° C., such as 90-120° C., preferably 105-110° C., and the pressure can be 1.01-3.04 MPa (10-30 atm), suitably 1.52-2.23 MPa (15-22 atm), such as 1.72-1.93 MPa (17-19 atm). The type of regenerator may include various conventional heat exchangers, such as shell-and-tube heat exchanger, standard vertical reboiler, etc. The regenerator can also be designed in a two-stage indirect heat exchange manner. The used intermediate transition fluid can be a heat exchange medium selected from water, water vapor, hexanediol solution and heat conduction oil, etc.

The superheated vapor discharged from the regenerator passes a pipe line, an optional drier such as diffusion drier to remove any possible moisture and enters into the turbine, and available energy can be extracted from the superheated vapor by reducing the pressure and enthalpy of the vapor, the extracted energy then is transported to an electric generator to implement an electric output. This power can also be directly applied, for example to drive a pump or a compressor, besides the use for electric power generation.

Figure 2:
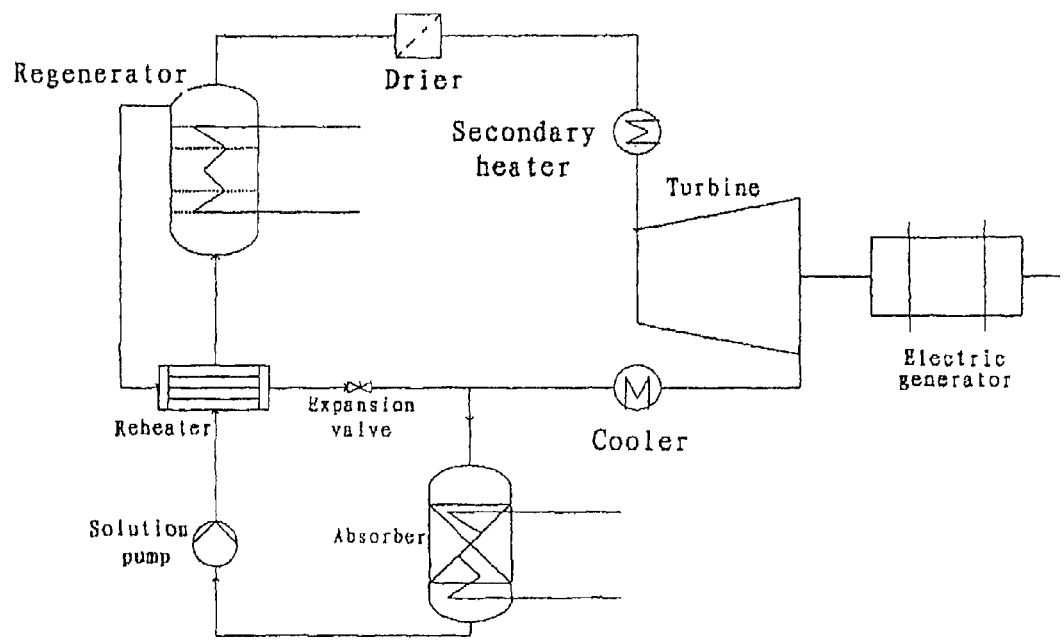
FIG. 2 is a schematic diagram of a process of power generation by using waste heat from a low temperature heat source according to an embodiment of the present invention, in which a cooler and a secondary heater are added.

FIG. 2 is a schematic diagram of the operation of main devices of another embodiment for implementing the thermodynamic cycle process according to the present invention. As compared to FIG. 1, the system of FIG. 2 further comprises a cooler for cooling the absorbed agent discharged from the turbine, and a secondary heater for elevating the superheating degree of the vapor entering into the turbine.

One or both of the cooler and the secondary heater can be set. The use of secondary heater can further ensure that only single gaseous phase enters into the turbine in order to improve the efficiency of the system. In addition, the additional heat exchange devices can improve the efficiency of waste heat recovery and power generation according to the invention, and further elevate benefit by employing a design of heat-power cogeneration process. For example, cooling water or medium can collect heat via the cooler and/or the absorber, and the collected heat can be used for municipal water, worming and agricultural applications.

Moreover, a liquid pressure work recovery apparatus may also be added in the system, and can be used to transport the internal energy of the absorbent generated from the high pressure regenerator to a solution pump by using a rotation device (such as hydraulic turbine) and together with the ammonia turbine allows the solution pump being operated without external power before the absorbent flows into the absorber. Thus, the energy generated from the system can be utilized more sufficiently.

Figure 3:
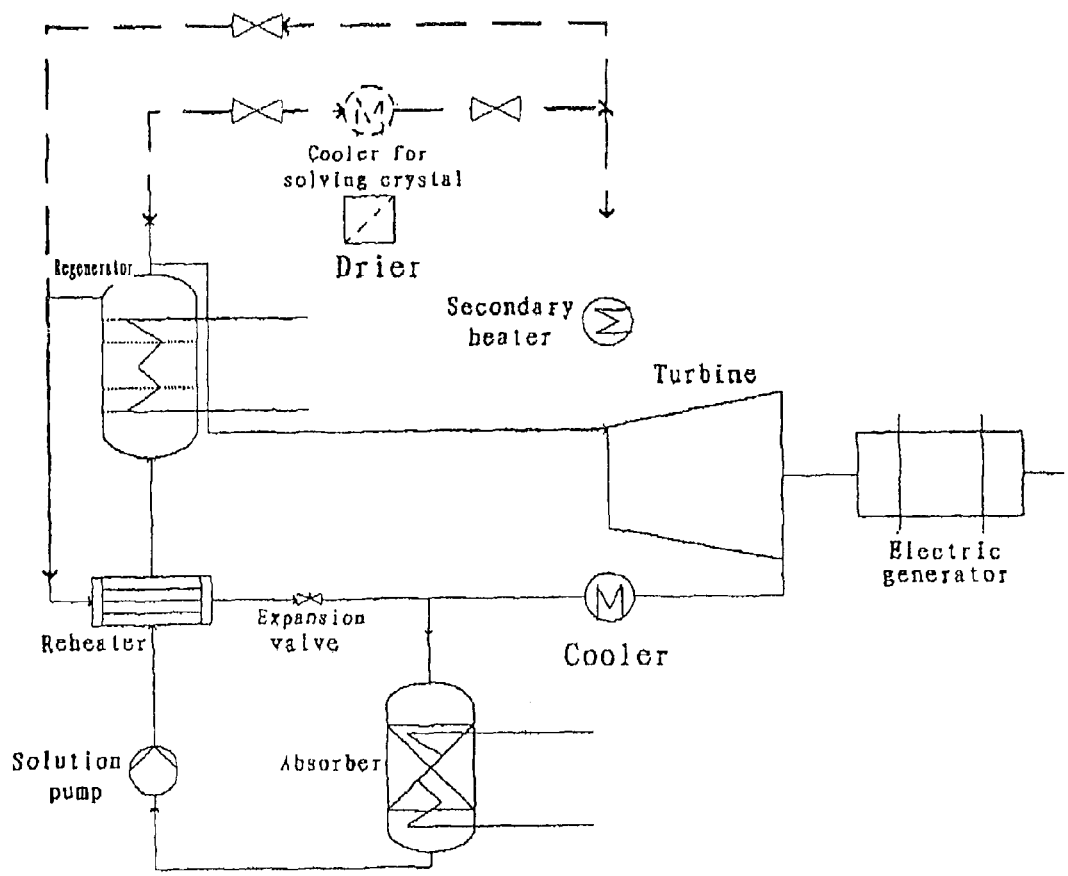
FIG. 3 is a schematic diagram of a process of power generation by using waste heat from a low temperature heat source according to another embodiment of the present invention, in which a cooler for solving crystal is added.

During the operation of the apparatus as shown in FIG. 1 and FIG. 2, the pipe lines and parts of the system would be clogged if they are not cleaned periodically. Thus, the system should be further added with cleaning devices such as cleaning valves which may be operated by using a control system of sensors. Hot liquid ammonia may also be used to clean pipe lines liable to being clogged by solving possibly formed crystal. Thus, FIG. 3 shows the connection of a cooler for melting crystal in the system.

The embodiments of the present invention are illustrated in detail by referring the drawings as mentioned above. The method of waste heat recovery and apparatus preparation according to the present invention can be carried out with a relatively low cost, suitable for low temperature heat sources, the concentration of the absorption liquid can be adjusted according to the temperature of the heat source, and thus the efficiency is relative high. The use of simplified electric generation system can increase benefit and the cooling water can be used for heat-power cogeneration so that the recovery rate of energy is further elevated.

The present invention is further illustrated with the below specific examples. These examples merely illustrate some possible embodiments of the present invention and should not be interpreted to restrict the scope of the present invention.

Example

In the example, the low temperature waste heat source having a temperature of 90-120° C. discharged from a 5,000,000 tons per year a petroleum refinery apparatus of Huabei Petrochem Co., Ltd was used as a heat source which was introduced into the waste heat recovery system according to the present invention. The devices and working conditions thereof used in the system were as follows:

1. Heater used as the regenerator: shell-and-tube heat exchanger, an absorption liquid of anhydrous ammonia-sodium thiocyanate solution in tube pass.

Parameters:
1) Heat source inlet temperature: 120-130° C., heat source outlet temperature: 90° C.;
2) $NH_3$-sodium thiocyanate solution inlet temperature: 86° C., $NH_3$-sodium thiocyanate solution outlet temperature: 110° C.;
3) Amount of heat exchange: ≥425.18 kW;
4) Fixed tube plate type: design pressure: 2.5 MPa, maximum working pressure: 1.8 MPa;
5) Heat exchange area of the heater: 37 $m^2$.

2. Drier.

Drying agent in random packing manner in a dram type, and optionally using two driers for switch.

Experimental Operation Conditions:
1) Maximum pressure: 3.0 MPa, practice working maximum pressure: 1.2 MPa;
2) Allowable positive pressure drop: $p \leq 1$ kg/cm$^2$;
3) Nominal water absorption rate of the drying medium: 31 (mass ratio)
4) Medium flow rate: 570 kg/h; working medium: superheated ammonia vapor;
5) Two drier used for switch, the volume of drier: 0.005 m$^3$.

3. Absorber.

Using liquid distributor and a lambdoid baffle structure, being filled with packing material, and having an absorption temperature of 40° C.

4. Absorption cooler.
1) Amount of heat exchange: 680 kW;
2) Cooling water having an inlet temperature of 32° C. and an outlet temperature of 42° C.;
3) Total heat and mass transfer area: about 57 m$^2$.

4. Solution circulating pump

Any tiny leakage may cause the precipitation of crystal at the leakage site, which may seriously damage rotation parts.

A canned-motor pump having a designed pressure at pump heat of 3.0 MPa or more was used. The parts contacting with medium had no copper or copper alloy member.

Lift head: 10 bar, flow rate: 900 kg/s, number: two, in which one was for standby.

6. Solution reheater

Shell-and-tube heat exchange was used.

Parameters:
1) Ammonia-deficient solution inlet temperature: 110° C., ammonia-enriched solution inlet temperature: 40° C.;
2) Amount of heat exchange: 167 kW;
3) Designed pressure: 3 MPa, practice maximum working pressure: 1.2 MPa;
4) Heat exchange area: 15 m$^2$.

7. Ammonia-salt solution expansion valve: using a pressure regulating valve.

8. Solution pump:

Lift head: 20 bar, flow rate: 4234 kg/hr, number: two, in which one was for standby.

9. Turbine

Elliott AYRT Turbine

Designed medium: water vapor; electric power: 22.4 kW;

Working Conditions:

Inlet: 1080 kPa; 294° C.;

Outlet: 350 kPa;

Maximum working conditions: 4827 kPa, 399° C., 689 kPa (outlet);

Rotation speed: 2900 rpm; 3045 rpm (max), 3502 (trip).

In the example, ammonia vapor was used as working medium, having an inlet pressure of 1080 kPa and an outlet pressure of 350 kPa.

In reference to the thermodynamic cycle process as shown in FIG. 2, the cycle operation of the present example was performed as follows.

An ammonia-enriched solution from a regenerator was heated to 110° C. in the heat exchanger by hot coal water, entered into a gas-liquid separation tank to separate out an superheated ammonia vapor and an ammonia-deficient solution. The superheated ammonia vapor was dried by a drier and then entered into a turbine for doing work. Exhausted gas (40° C., 0.48 MPa) and the depressurized ammonia-deficient solution were mixed and entered into an absorber.

The ammonia-deficient solution at 110° C. was subjected to heat exchange with the circulated ammonia-enriched solution in a reheater and was cooled to 45° C., passed a throttle valve for depressurizing and entered into the absorber. After ammonia vapor was absorbed, the resultant ammonia-enriched solution (40° C.) was pressed by a solution pump, entered into a reheater and was heated to 86° C., then entered into the regenerator to repeat the above circulation.

The electric power ratio of using ammonia vapor as medium to that of using water vapor as medium was:

$$P_a/P_w = (\Delta H_a V_a \rho_a)/(\Delta H_w V_w \rho_w) = 1.4$$

The experimental results showed that the ammonia system had an electric power of: 1.4×22.4=31.36 KW.

This example indicated that the present invention had advantages of being useful in low temperature heat sources for waste heat recovery and power generation, in which the absorption liquid concentration can be regulated according to the temperature of heat source in order to provide a proper ammonia vapor superheating degree, supplementary fuel was not needed, the apparatus was simple and safe. In the meantime, the design requirement of turbine that both inlet and outlet temperature should higher than the dew point was satisfied, so that the corrosion of turbine blades caused by liquid drops was efficiently prevented.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A method for waste heat recovery, comprising the following steps:
   a) performing heat exchange in a regenerator between an anhydrous absorption liquid comprising an absorbent and an absorbed agent from an absorber and a heating working medium from a low temperature heat source to form the absorbent and the superheated high pressure absorbed agent;
   b) conveying the superheated high pressure absorbed agent generated in Step a) through a dryer, then conveying the dried superheated high pressure absorbed agent to a turbine to generate power or to a heat exchange device to provide a heat source; and
   c) contacting the absorbent from Step a) with the absorbed agent discharged from the turbine or the heat exchange device of Step b) in the absorber to form the anhydrous absorption liquid.

2. The method according to claim 1, wherein the turbine of Step b) is in connection with a power generator for power generation.

3. The method according to claim 1, wherein the turbine of Step b) is in connection with a device in need of power driving.

4. The method according to claim 3, wherein the device in need of power driving comprises a pump or a compressor.

5. The method according to claim 1, wherein the anhydrous absorption liquid formed in the Step c) is preheated by the absorbent generated in Step a) before entering into the regenerator again.

6. The method according to claim 1, wherein the absorbed agent from the turbine is cooled before entering into the absorber.

7. The method according to claim 1, wherein the dried superheated high pressure absorbed agent is heated to elevate heating degree before entering into the turbine.

8. The method according to claim 1, wherein the regenerator is of two-stage indirect heat exchange manner having an intermediate transition fluid selected from water, water vapor, hexandiol solution and heat conduction oil.

9. The method according to claim 1, wherein the absorber is of two-stage indirect heat exchange manner having an intermediate transition fluid selected from water, water vapor, hexandiol solution and heat conduction oil.

10. The method according to claim 1, wherein the absorbent consists of at least one nonvolatile inorganic salt ingredient.

11. The method according to claim 10, wherein the inorganic salt comprises lithium nitrate, sodium thiocyanate, potassium thiocyanate, potassium carbonate or a mixture thereof.

12. The method according to claim 10, wherein the inorganic salt is in an amount of greater than 52 wt % in relative to the total weight of the absorption liquid.

13. The method according to claim 1, wherein the anhydrous absorption liquid further comprises a drying agent in an amount of 0-5 wt % in relative to the total weight of the absorption liquid.

14. The method according to claim 13, wherein the drying agent is any one of calcium oxide, silica gel, molecular sieve, or a mixture thereof.

15. The method according to claim 1, wherein the anhydrous absorption liquid further comprises a surfactant in an amount of 0-2 wt % in relative to the total weight of the absorption liquid.

16. The method according to claim 15, wherein the surfactant is diethylhexanol.

17. The method according to claim 1, wherein the absorbed agent is anhydrous ammonia.

18. The method according to claim 1, wherein the superheated high pressure absorbed agent is a superheated, vaporized, high pressure absorbed agent.

19. An apparatus for waste heat recovery, comprising:
a regenerator, for performing heat exchange between an anhydrous absorption liquid comprising an absorbent and an absorbed agent from an absorber and a heating working medium from a low temperature heat source to form the absorbent and the superheated high pressure absorbed agent;
a dryer for drying the superheated high pressure absorbed agent generated by the regenerator;
a turbine or a heat exchange device, for using the dried superheated high pressure absorbed agent generated by the dryer to generate power or to provide a heat source;
an absorber, for contacting the absorbent generated by the regenerator with the absorbed agent discharged from the turbine or the heat exchange device to form the anhydrous absorption liquid; and
a solution pump, for conveying the anhydrous absorption liquid to the regenerator.

20. The apparatus for waste heat recovery according to claim 19, which further comprises a power generator in connection with the turbine.

21. The apparatus for waste heat recovery according to claim 19, which further comprises a device in need of power driving in connection with the turbine.

22. The apparatus for waste heat recovery according to claim 21, wherein the device in need of power driving comprises a pump or a compressor.

23. The apparatus for waste heat recovery according to claim 19, which further comprises a pre-heater for preheating the anhydrous absorption liquid before the anhydrous absorption liquid enters into the regenerator.

24. The apparatus for waste heat recovery according to claim 19, which further comprises a cooler.

25. The apparatus for waste heat recovery according to claim 19, which further comprises a device for recovering liquid pressure work, which transports the pressure internal energy of the absorbent generated from the high pressure regenerator to a solution pump by using a rotation device before the absorbent flows into the absorber.

26. The apparatus for waste heat recovery according to claim 25, wherein the rotation device is a hydraulic turbine.

27. The apparatus for waste heat recovery according to claim 19, wherein the solution pump is driven by the turbine without external power.

* * * * *